United States Patent [19]
Jaisle et al.

[11] 3,860,470
[45] Jan. 14, 1975

[54] PROCESS FOR MAKING MASTER TEXTURED COPIES FOR USE IN MAKING TEXTURED LAMINATES

[75] Inventors: Richard Frederick Jaisle, Harrison; Donald Joseph Albrinck; Gene Edward Grosheim, both of Cincinnati, all of Ohio

[73] Assignee: Formica Corporation, Cincinnati, Ohio

[22] Filed: Apr. 5, 1973

[21] Appl. No.: 348,356

Related U.S. Application Data

[63] Continuation-in-part of Ser. No. 75,243, Sept. 24, 1970, abandoned, which is a continuation-in-part of Ser. No. 60,652, Aug. 3, 1970, abandoned.

[52] U.S. Cl. .................. 156/85, 156/182, 156/242, 161/116, 161/155, 161/268, 161/413, 264/220, 264/230, 264/258

[51] Int. Cl. .......................................... B29c 25/00

[58] Field of Search ......... 156/84, 85, 86, 219, 196, 156/220, 242, 243, 245, 246, 182; 264/219, 220, 230, 212, 257, 258, 234, 235, DIG. 57; 161/97, 116, 155, 173, 124, 266, 270, 413, 264, 268

[56] References Cited

UNITED STATES PATENTS

| | | | |
|---|---|---|---|
| 2,574,200 | 11/1951 | Teague | 156/85 |
| 2,606,855 | 8/1952 | Jenkins | 156/219 |
| 3,303,081 | 2/1967 | Michaelson et al. | 156/219 |
| 3,311,520 | 3/1967 | Michaelson et al. | 156/209 |
| 3,597,293 | 8/1971 | Willet | 156/85 |

*Primary Examiner*—Charles E. Van Horn
*Assistant Examiner*—F. Frisenda, Jr.

[57] ABSTRACT

A process for producing a heat-stabilized, shrink-resistant textured master copy for use in producing textured laminates from a textured design model which comprises heat treating the heat and pressure consolidated textured master thermoset copy in an air circulating oven under controlled conditions in order to shrink the copy until it is no longer subject to further significant shrinking or distortion of the surface texture.

4 Claims, No Drawings

PROCESS FOR MAKING MASTER TEXTURED COPIES FOR USE IN MAKING TEXTURED LAMINATES

REFERENCE TO RELATED APPLICATIONS

This application is a continuation-in-part of our earlier application Ser. No. 75,243, filed Sept. 24, 1970 now abandoned which application, in turn, was a continuation-in-part of our earlier application Ser. No. 60,652, filed Aug. 3, 1970, now abandoned.

BACKGROUND OF THE INVENTION

Decorative laminates have been produced for a considerable number of years by a plurality of prior art processes. In making such laminates, it is conventional to utilize a plurality of resin impregnated core sheets generally composed of kraft paper which has been impregnated with a thermosetting resin and more particularly as a general rule with thermosetting water soluble or water insoluble phenolic resins or mixtures thereof. The U.S. Pat. No. 3,044,895 discloses this use and is incorporated herein by reference. When the kraft paper has been impregnated with the thermosetting resin, the sheets are dried and cut to the appropriate size. Thereupon, a plurality of these resin impregnated sheets are stacked in a superimposed relationship. The number of plies or sheets in the stack will depend on the ultimate intended use of the laminate. For most purposes, the number of plies of these core sheets will total about six to nine. The stack of core sheets is inserted into a laminating press and is heat and pressure consolidated to a unitary structure. During said consolidation step the thermosetting resins are converted to the thermoset state.

For decorative laminates, there is placed on the stack of core sheets, a decorative sheet which is generally a sheet of alpha-cellulose paper bearing a printed design or a light color and impregnated with a noble thermosetting resin which is not subject to significant darkening upon the application of heat. Suitable resins for the decorative sheets are the aminotriazine resins and more particularly the melamine-formaldehyde resins, the benzoguanamine-formaldehyde resins and the unsaturated polyester resins and the like. It is generally desirable when making decorative laminates to make use of a protective overlay sheet which is similar to the decorative sheet but generally devoid of design and in the final laminate is transparent. The noble thermosetting resins used in the decorative sheets and in the overlay sheets, like the thermosetting phenolic resins used in the core sheets, are converted to the thermoset state during the heat and pressure consolidation step. Some of the laminates produced are heat pressure consolidated to a unitary structure in which the press plate is a polished stainless steel plate. Such an approach produces a very smooth surface laminate with a glossy finish. Other techniques are used to produce laminates with a smooth surface finish but with a satin or brushed textured effect. More recently the dictates of fashion have demanded textured laminates which can have a three dimensional surface of glossy or dull finishes.

THE FIELD OF THE INVENTION

The present invention is in the field of heat stabilizing textured laminate master copies for use in making three dimensional textured decorative laminates.

DESCRIPTION OF THE PRIOR ART

The prior art, as it is known to the present inventors, relating to the manufacture of textured laminates by various techniques as is shown in the following U.S. Pat. Nos. 2,606,855, 3,303,081, 3,311,520, 3,308,227 and 3,373,068. These patents are incorporated herein by reference.

SUMMARY OF THE INVENTION

This invention relates to a process of heat-stabilizing by shrinking a heat and pressure consolidated textured laminated master copy unitary structure composed of a plurality of thermosetting resin impregnated fibrous paper sheets which resin has been cured to an infusible-insoluble thermoset state comprising heating said structure in an air circulated oven at a temperature varying between 110°C. and 145°C. for a period of time varying inversely between about 24 hours and 100 hours in order to shrink the structure until it is no longer prone to further significant shrinkage or distortion of the surface texture when subjected to further heating in the manufacture of textured decorative laminates.

The original design model or copy can be prepared from a flat iron plate that is approximately 0.135 inch in thickness and a suitable length and width in keeping with the size of the ultimate laminate to be produced, namely, about 4 × 8 or 5 × 10′. The iron plate is mechanically or chemically etched on one side. A ceramic like material capable of withstanding high temperature and pressure such as a commercially available asbestos furnace cement is applied to the etched surface. A textured design such as a slate textured design is made on the furnace cement by hand, using a sculpturing tool such as a spatula. The textured furnace cement coated plate is then dried in a forced air oven for a minimum of 16 hours at 80°C. The drying removes the volatiles and hardens the cement thereby improving its bond to the base plate. Other high temperature ceramic materials could be used such as porcelains, liquid silicates filled with refractory fibers and the like. After drying, the textured surface is coated with a silicone release agent and allowed to air dry. This final baked plate, called the design imparting model, is ready for use. It is a positive image of the ultimate textured design. The process for making such a textured design model is disclosed in the U.S. Pat. No. 3,718,496, issued Feb. 27, 1973, which patent is incorporated herein by reference. There are other methods for preparing the design imparting model, such as cast aluminum or steel plates by way of plaster of paris or sand mold techniques. Still further, acid etched or electrodeposited plates may be used as the textured design model.

The following is a detailed description of the process to produce a nominal 4 × 10 foot deep textured high pressure laminate. In the description, it will be obvious to anyone skilled in the art that the nominal 4 × 10 foot size deep textured laminate does not restrict the scope of the process to any particular size. The process encompasses all sizes as long as the shrinkage effects are taken into account during the processing period. All of the laminates in the following examples are pressed using the following cycle:

Pressure 350 psi for the first 10 minutes and 1,400 psi for the remainder of the cycle; in the first sequence the temperature is maintained at about 135°C. for about the first 19 minutes thereupon the temperature is maintained between about 135°C. and 144°C. for the next five to seven minutes; and, finally, the temperature is maintained at about 144°C. to 146°C. for the following 19 to 21 minutes.

EXAMPLE 1

A 51 × 125 inch design-imparting model capable of withstanding conventional temperatures and pressure is used to press against an assemblage of eight laminations of saturating Clupak kraft paper, available from Westvaco Paper Co., which has been impregnated with a water soluble phenolic resin to a 55 percent resin pickup and 14–20 percent flow level. Water insoluble phenolic resins and/or blends of water soluble and water-insoluble phenolic resins may be used. However, we prefer the water soluble phenolic resins. Clupak paper is a commercially available extensible paper which can be stretched in both directions. However, the Clupak paper can be stretched only 8 percent in one direction and only about 2–4 percent in the other. This extensibility allows the paper to be stretched over the design imparting model during the pressing operation and thus allows more definition of design detail in the laminated master. More expensive extensible paper, such as resin-X-crepe paper, is available from Cincinnati Industries, Inc. and is capable of being stretched about 33 percent in both directions. An assembly is prepared preparatory to insertion in a laminating press of the following items reading from the top to the bottom:

- the topmost iron plate,
- 16 sheets of kraft paper cushion and,
- the design imparting model with the texture facing downward,
- a layer of release paper,
- a paper-backed aluminum release sheet, with the aluminum facing downward,
- eight sheets of Clupak paper treated with the water soluble phenolic resin,
- another layer of release paper,
- eight sheets of kraft paper cushion,
- a layer of release paper,
- another iron plate,
- 16 sheets of kraft paper cushion,
- an iron plate.

The assembly set forth hereinabove is introduced into the laminating press and consolidated under heat and pressure so as to convert by curing the thermosetting resin into a thermoset state and converting at the same time the assemblage into a textured laminated unitary structure. After the pressing cycle is completed, the assembly is removed from the press and the heat and pressure consolidated laminate of thermoset phenolic resin impregnated Clupak paper is recovered and is the negative image of the original design model.

The resulting laminate is herein known as a master copy and is trimmed to 50 5/32 ± ⅛ inches wide by 123 ± ⅛ inches long. This master copy has a tendency to shrink when used to make a plurality of laminates therefrom and as a consequence, the master copy textured laminate is subjected to a heat treatment step before use so as to eliminate further significant shrinkage. To accomplish this, the master copy of the textured laminate is baked in an air-circulated, steam-heated, drying oven at a temperature varying between about 110°C. and 145°C. for a period of time varying inversely between about 24 hours and 100 hours. Obviously, the higher temperature will be used for the shorter period of time and the lower temperature for the longer period of time. Preferably, one would heat the master copy for a period of about 48 hours at about 135°C. During this heat-treating step, the textured laminate undergoes a shrinkage amounting to about 0.5 – 0.6 percent overall. After baking, the master copy laminate now measures about 49 3/4 ± ⅛ × 122 ± ⅛inches and is no longer subject to further significant shrinkage or distortion of the surface texture.

The measure of shrinkage of these textured master copy laminates is shown in Table I hereinbelow. In that table the standard Clupak or paper impregnated with water soluble phenolic resins as well as the standard kraft filler phenolic resin laminates were studied. Both deep-textures as well as nontextured surfaces were studied in order to derive the answer to any questions concerning the effect of the textured surface on shrinkage.

It will be noticed that approximately 90 percent of the total shrinkage of the master laminate is achieved after 24 hours. The Clupak laminates shrink much more than the standard filler counterparts namely approximately three times in the length direction and 1.8 times in the cross direction. Furthermore, the Clupak based laminates experience a much more uniform shrink in the length and cross direction (1.1/1.0: cross-/length ratio) as compared to 1.75/1.0: cross/length for the standard filler counterparts. This latter point is important when considering shrinkage and registrations of slate and geometric patterns. It is much easier for the artist to design a pattern when it shrinks uniformally rather than one which experiences directional shrinkage.

TABLE I

Shrinkage of Textures Masters at 135°C.
(All Laminates 8 Ply, Standard Press Cycle, 1400 psi/146°C. Cure/20 Minutes)

| Laminate | | | | | Percent Shrinkage (Averge of 10 Values) | | | | | | |
|---|---|---|---|---|---|---|---|---|---|---|---|
| Paper | | | Resin | Texture | Number of Hours Baked at 135°C. | | | | | | |
| Type | Basis Wt. | Direction | % | Depth | 4 | 8 | 24 | 48 | 67 | 78.5 | 102.5 |
| Clupak | 100 | Length | 55 | Deep[a] | .53 | .63 | .77 | .83 | .86 | .85 | .86 |
| Clupak | 100 | Cross | 55 | Deep | .64 | .74 | .90 | .97 | .97 | .98 | 1.00 |
| Clupak | 100 | Length | 55 | None | .59 | .69 | .84 | .90 | .92 | .92 | .94 |
| Clupak | 100 | Cross | 55 | None | .62 | .74 | .92 | .98 | 1.00 | 1.01 | 1.02 |
| Std. Kraft | 110 | Length | 27 | Deep[a] | .23 | .26 | .29 | .30 | .31 | .32 | .32 |
| Std. Kraft | 110 | Cross | 27 | Deep | .40 | .44 | .50 | .53 | .54 | .55 | .56 |
| Std. Kraft | 110 | Length | 27 | None | .23 | .26 | .29 | .30 | .30 | .31 | .32 |
| Std. Kraft | 110 | Cross | 27 | None | .41 | .46 | .52 | .54 | .55 | .56 | .57 |

[a] Maximum Depth of Texture = 0.020"
Sample Size = 5.500" × 0.500"

The heat-stabilized textured master copy laminates may be bonded together in a back-to-back relationship to make a one-piece "double master." Bonded masters greatly increase the durability of the masters since they are thicker and require less handling. Furthermore, there is less opportunity for misalignment in the press pack. It is permissible to sand the back of the single master before bonding, but it is also possible to bond the unsanded masters. If desired, an additional piece or pieces of the same phenolic resin impregnated paper or different thermosetting resin impregnated paper can be used in bonding a pair of masters together. These additional pieces of paper would be positioned between the two masters in back-to-back relationship. It is possible to bond the entire areas of the laminates or if desired one can simply bond around the edges of the laminates. The sanding step provides an opportunity to remove or diminish unwanted gross thickness irregularities which might occur in the manufacture of masters.

A decorative laminate assembly, herein known as a sheet buildup, is prepared for insertion in the laminating press as follows:

SHEET BUILDUP 1 release aluminum,
1 thermosetting melamine resin impregnated overlay sheet,
1 thermosetting melamine resin impregnated print sheet,
8 thermosetting phenolic resin impregnated kraft paper core sheets,
1 wax release sheet,
8 thermosetting phenolic resin impregnated kraft paper core sheets,
1 thermosetting melamine resin impregnated print sheet,
1 thermosetting melamine resin impregnated overlay sheet,
1 release aluminum.

The above assemblies are incorporated into a pack assembly as follows:

PACK ASSEMBLY top iron,
8 kraft cushion (unimpregnated)
1 wax release sheet
8 kraft paper core sheets (impregnated)
1 print
1 overlay
1 aluminum release
1 double bonded master
1 sheet buildup
1 double bonded master
1 sheet buildup
1 double bonded master
1 sheet buildup
1 double bonded master
1 aluminum release
1 overlay
1 print
8 kraft paper core sheets (impregnated)
1 wax release sheet
8 kraft cushion (unimpregnated)
press pan or carrier The entire assembly is heat and pressure consolidated to a unitary structure. Upon removing from the press, the double bonded textured master copy laminate is separated from the textured decorative laminates. The decorative laminates thus produced are subject to standard post-finish treatments such as trimming, sanding of the back such that the laminate 0.070 inch. in thickness is between 0.050 and .070 inch.

The alpha-cellulose print papers used in the decorative laminates of the present invention have a basis weight of about 65–123 pounds per ream with a melamine resin content between 35 and 55 percent by weight.

The alpha-cellulose overlay will have basis weights of about 15–35 pounds with melamine resins content between 50 and 75 percent by weight.

It is imperative in making a textured laminate that the overlay be present in order to prevent the phenolic resin in the core sheets from migrating through the print sheet onto the surface of the laminate. This phenomena is known as strikethru.

Strikethru is no problem if the textured depth is small (less than 0.008 inch) or if the print sheet is a dark color. However, when the texture depth is increased to about 0.010 inch to 0.050 inch, strikethru does occur unless an overlay sheet is used, and the low pressure or protuberant areas of the laminate will take on the color of the phenolic core.

There is associated with the manufacture of deep textured high pressure laminates (depth greater than 10 mils) a phenomena known as "edge whitening." This is particularly noticeable on darker patterns and is caused by uneven pressure distribution at the edges of the laminate mostly in the length direction.

A technique which is useful in reducing the problem of low pressure edge whitening is described hereinbelow.

In one instance a narrow strip of treated paper tape is used to bond the edges of the masters together which provides additional thickness to the masters along the long edges or along the long and short edges and thus causes more pressure to be applied at the edges of the pack in the pressing operation. This technique is known as the use of "wedges." A second and preferred procedure for reducing the number of rejects because of low-pressure edge whitening, is to place one or two strips of paper, usually 3 inches wide by the length of the laminate, in each long edge in the top and bottom cushion of each press pack. The cushion consists of eight laminations of kraft paper 80–120 lb. basis weight per ream (3,000 sq. ft.) and is used in laminating to enhance heat and pressure distribution during the consolidation. The wedges of strips of paper mentioned previously, are inserted between the fourth and fifth layers of the cushion. This extra paper provides the needed increase in pressure along the edges. In recent tabulation where half of the day's run was produced with wedges and half without wedges, the reject rate for edge whitening was reduced from 57 percent without wedges to 5 percent with wedges.

In carrying out the various steps of the present invention, it is very frequently desirable to make use of a release sheet or release paper that is positioned between the design model and the layers of resin impregnated paper that are to be converted to a design carrying laminate. These release members are used for both the surface and the back of the laminates. These different release sheets will change surface gloss and texture. Among those which may be used in the practice of the process of the present invention are Pat-a-par, a product of the Patterson Parchment Paper Co., glassine, polypropylene films, aluminum foils, paper-backed aluminum foils, wax paper and the like.

EXAMPLE 2

Example 1 is repeated in all essential details except two original design imparting models are used. One is positioned on the top and the other is positioned on the bottom of 16 laminations of the phenolic resin impregnated Clupak. The assembly is heat and pressure consolidated to a unitary structure using the following assembly:

- the top iron plate,
- 16 sheets of kraft paper cushion (unimpregnated),
- a design model with texture facing downward,
- a paperback aluminum release sheet with the aluminum facing upward,
- a paperback aluminum release sheet with the aluminum facing downward,
- 16 sheets of Clupak paper treated with the water soluble phenolic resin,
- a paperback aluminum release sheet with the aluminum facing upward,
- a paperback aluminum release sheet with the aluminum facing downward,
- a design model with texture facing upward,
- 16 sheets of kraft paper cushion (unimpregnated),
- the bottom iron plate.

COMPARATIVE EXAMPLE 3

Example 1 is repeated in all essential details except that the textured master laminate copy is used directly without heat treatment to produce a decorative laminate.

The textured image produced on the resulting laminate from the textured master laminate copy is slightly out of registration because the textured master laminate copy has shrunk during the pressing. After as few as 10 subsequent pressings, the textured master laminate copy has shrunk approximately one inch in a 10-ft. length and one-half inch in a 4-ft. width. Consequently, the textured master laminate copy must be discarded.

The number of sheets of thermosetting resin impregnated paper used to prepare a single surface textured laminated master copy unitary structure may be varied between six and nine. Quantities greater than nine, such as 10, 15 and more can be used but with certain disadvantages. The master copy is more expensive, more difficult to handle and takes up valuable production space in the laminating press.

When making a "double master," wherein both opposite broad surfaces are textured, one should use between 12 sheets and 18 sheets of the thermosetting resin impregnated paper. Quantities greater than 18, such as 20, 25, 30 or more, may be used but the same disadvantages are experienced as with the "single master."

We claim:

1. A process of heat-stabilizing by shrinking a heat and pressure consolidated textured laminated master copy unitary structure composed of a plurality of thermosetting resin impregnated fibrous paper sheets which resin has been cured to an infusible-insoluble thermoset state comprising heating said structure in an air circulated oven at a temperature varying between 110°C. and 145°C. for a period of time varying inversely between about 24 hours and 100 hours in order to shrink the structure until it is no longer prone to further significant shrinkage or distortion of the surface texture when subjected to further heating in the manufacture of textured decorative laminates.

2. The process according to claim 1 in which the textured laminated unitary structure has the textured effect imparted thereto by impressing a textured design model into the surface of an assemblage of a stack of thermosetting resin impregnated fibrous paper sheets during the heat and pressure consolidation step in a laminating press.

3. The process according to claim 1 in which the master copy is heated for about 48 hours at about 135°C.

4. A process for making a double master copy textured laminated unitary structure comprising bonding a pair of heat stabilized masters prepared according to the process of claim 1 in a back-to-back relationship.

* * * * *